Patented Apr. 16, 1929.

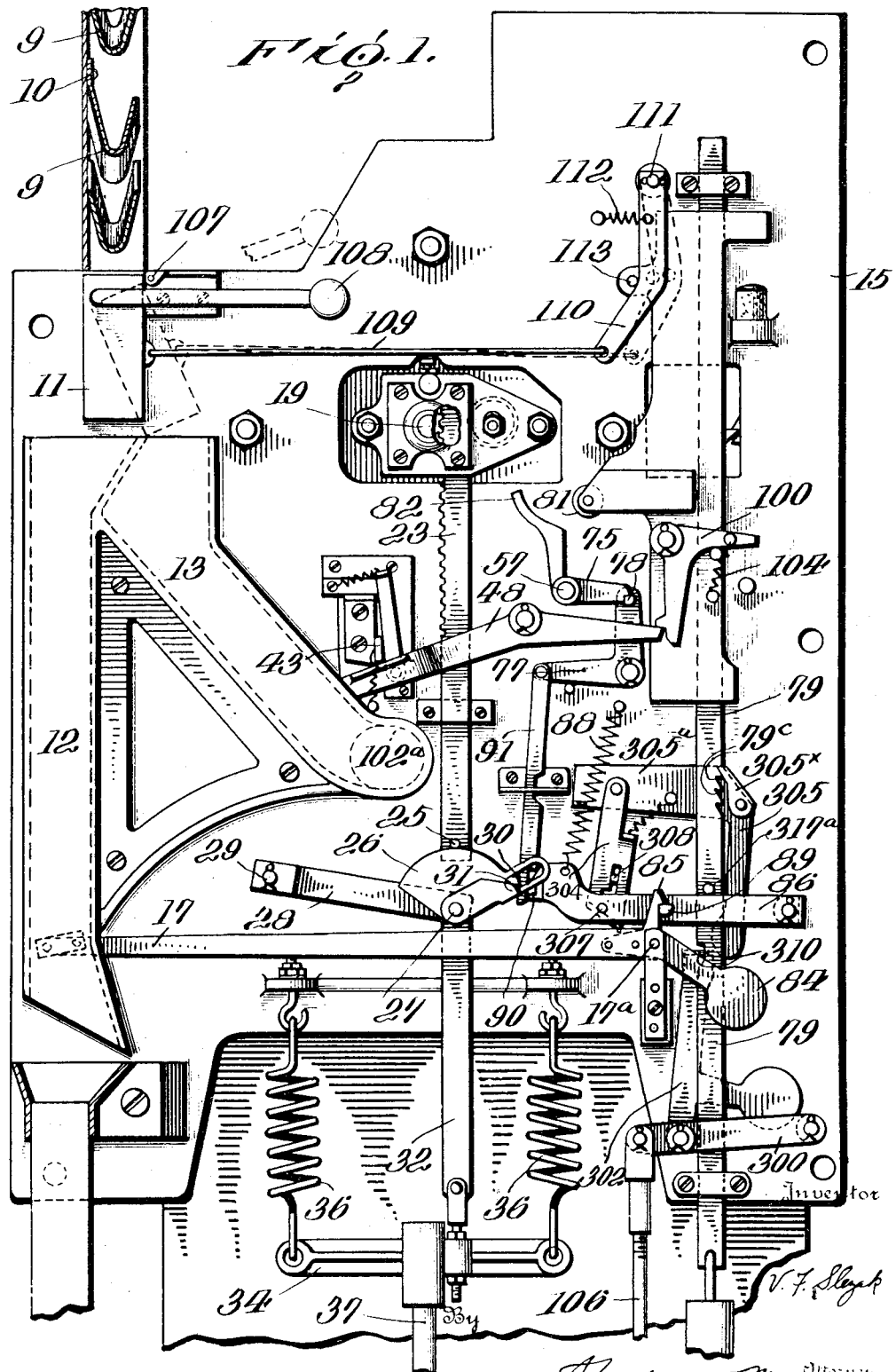

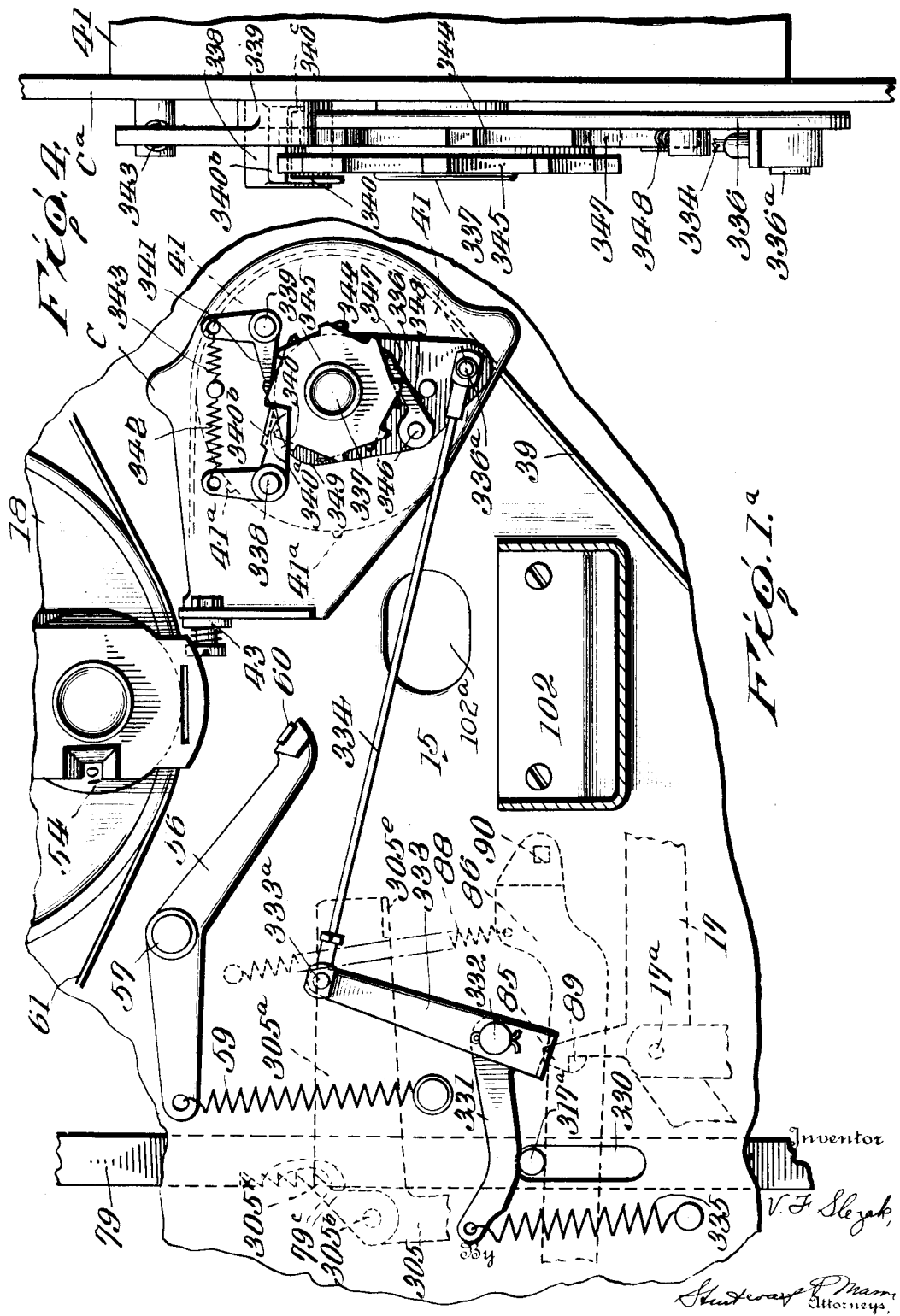

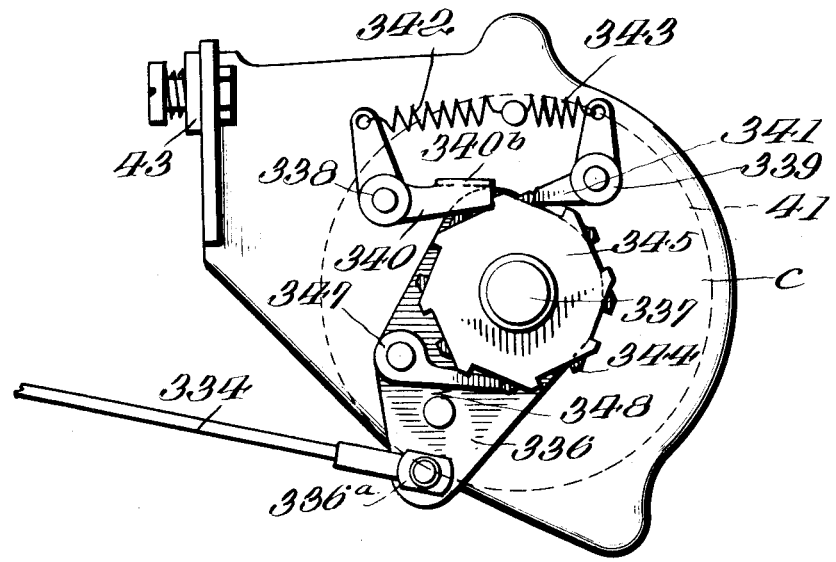
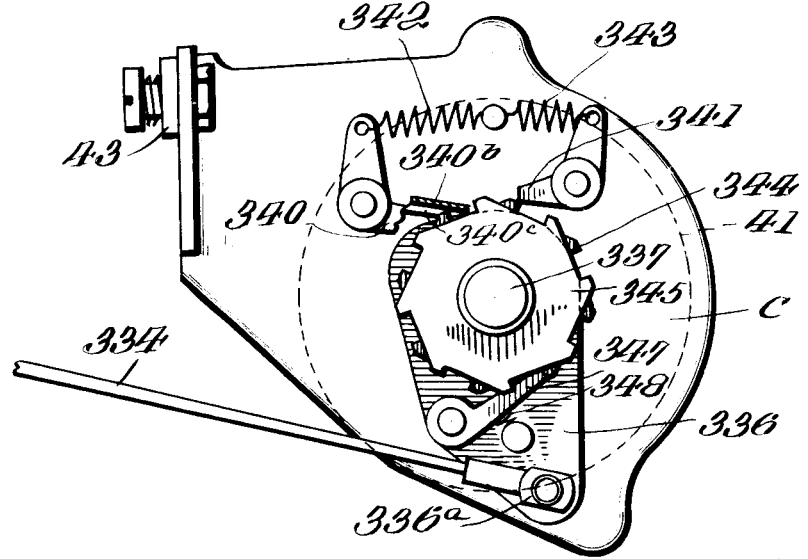

1,709,412

UNITED STATES PATENT OFFICE.

VINCENT F. SLEZAK, OF CHICAGO, ILLINOIS, ASSIGNOR, BY MESNE ASSIGNMENTS, TO THE AMERICAN TICKET SCALE COMPANY, OF CHICAGO, ILLINOIS, A CORPORATION OF ILLINOIS.

TICKET-FEEDING APPARATUS.

Application filed November 10, 1926. Serial No. 147,531.

This invention relates to improvements in ticket-feeding apparatus which are particularly adapted for use in coin-controlled, ticket-printing, weighing machines of the type set forth in my copending application Serial No. 97,034, filed March 24, 1926, now U. S. Patent No. 1,610,893, and my copending application Ser. No. 135,605, filed Sept. 15, 1926.

With many previous types of ticket-printing weighing machines, the ticket was advanced by a movement derived from the actuation of the machine platform by the weight of the person or article thereon. It has been found that unless some positive lock is provided for the ticket-feeding device, the casual upward and downward movements of the scales platform under the weight of persons or articles will cause a feeding of successive tickets, either as a whole or by fractions, although no coin had been deposited within the machine to effect a printing. This "pumping" of the tickets, in some types of machines, causes an obstruction which prevents the later discharge of a completely printed ticket, when the machine is operating in the normal manner, upon the depositing of a coin.

One of the features of this device is therefore to prevent such pumping of tickets, and to cause the ticket to be advanced only in the normal course of cycles of weighing and printing operations as controlled by the weight of persons and by the depositing of coins.

Another feature of this invention is the provision of means whereby a strip of tickets may be positively and regularly advanced during the cycle of operation, by an amount which is uniform from one end of the ticket strip to the other.

The mechanism is so designed that ticket-feeding occurs only after the previous ticket has been ejected for delivery. Since in most machines of this type, a ticket is only delivered upon the insertion of a coin, and such is the illustrative type employed herein, it follows that the ticket-feeding is sequential to the depositing of the coin which effects the delivery of the preceding ticket.

With these and other objects in view as will appear in the course of the following specification taken in conjunction with the accompanying drawings, the latter illustrate the details of assembly of an illustrative example of execution of the present invention. From these drawings, certain features of the complete machine have been eliminated for the greater clearness and distinctness of disclosure, but such details are described in my copending applications, Serial Nos. 97,034 and 135,605, and reference is made thereto for the general manner of cooperation of the present device with the associated power storing, printing and ticket-severing features.

In the drawings:

Fig. 1 is a rear elevation of the parts of a weighing machine showing the parts in the position ready for the printing and delivery of a ticket upon the insertion of a coin into the mechanism.

Figure 1ª is a front elevation of the operating parts of the present ticket-feeding apparatus proper, shown in the position of the parts immediately following the advancement of a ticket into position for printing.

Fig. 2 is a detailed view of the ticket drum, ratchet and pawl mechanism, with the advancing pawl fully retracted.

Fig. 3 is a detail similar to Fig. 2, but showing the advancing pawl in a ticket-feeding position, and nearly at the end of its stroke.

Fig. 4 is an end elevation of the ticket-feeding and limiting pawls and ratchets.

As referred to in my copending applications, this illustrative example demonstrates the employment of this invention in conjunction with a coin-controlled, ticket-printing, weighing machine, which consists of a vertical enclosing casing for receiving the indicating and printing mechanisms, and a base having a movable platform thereon. When a person or article comes upon the platform, the latter moves downward under the weight thereon. During this downward movement, power is stored within the weighing machine by raising weights or actuating springs: and also a type wheel is brought into a position opposite a printing point so that it presents an appropriate type-setting to indicate the weight of the article or person upon the platform. In storing power, a plunger rod is moved from a "rest" to a "power-storage" position in which it is held by a detent. During this movement of the plunger, ticket-feeding occurs. If the person or article be removed from the platform, the plunger is held in its "power-storage" position, and the wheel returns to its zero or minimum indication: if on the other hand, a coin is deposited within the machine, whether or not a weight is upon the platform, the detent holding the plunger is withdrawn therefrom, and the plunger moves into its "rest" position. A printing mechanism is energized upon the deposit of the coin, and during such movement of the plunger is reset; whereby the positioned type upon the type wheel are caused to print upon the ticket; and thereafter the ticket is severed and delivered out of the weighing machine, by a severing device controlled by this plunger. This printed indication will be that of the weight of the person or article upon the platform. When another person or weight comes upon the platform, the plunger will again be moved to the "power-storage" position and a new ticket fed, etc.

As set forth in my copending applications, a movable coin chute or diverter is interlocked with the plunger; so that if a coin be placed in the machine, it will be returned by the chute unless the plunger has been moved to a position in which it is ready to effect the normal sequence of printing and severing operations, and only when the machine is ready for its normal operation is the coin received and conveyed to the coin-tripped lever to accomplish the aforesaid release of the plunger detent.

According to the present invention, the ticket-feeding mechanism is actuated during the "power-storing" movement of the plunger, whereby a fresh ticket is presented to the type wheel and printing mechanism: whereas during the "power delivering" movement of the plunger, the ticket-feeding mechanism is caused to return to a position in which it is ready, upon a new "power-storing" movement of the plunger, to advance a new ticket. Suitable stop devices are provided to limit the movement of the ticket-feeding device during the feeding operation to prevent overthrow, so that at all times a uniform and predetermined movement is attained; likewise devics are provided to prevent any retrograde movement of the ticket-holding member during the return movement of the ticket-feeding mechanism. Furthermore, devices are provided to prevent any movement of the ticket-feeding mechanism after a feeding movement, except following the deposit of a coin, i. e., following the printing and delivery of the previously advanced ticket.

In the present drawings, reference numerals employed in my copending applications will be used so far as applicable.

The mechanism is mounted upon a vertical metal plate 15, which has a suitable ticket magazine thereon from which the ticket strip 39 is drawn during the ticket-feeding operations. Following the printing and severing of an individual ticket from this strip, the ticket drops into a chute 102 which conveys it to a tray presented at the front of the weighing machine. As a result of the superimposition of a weight upon the platform of the weighing machine, the power storing plunger 79 is moved upwardly, whereby power is stored for controlling the successive operations and resetting of the printing mechanism and the ticket-severing mechanism. The ticket-printing mechanism is shown in this drawing as including the crank lever 56 pivoted on a fixed shaft 57 and actuated by a coil spring 59. A printing surface 60 on the hammer end of the lever 56 cooperates with the relatively positioned types on the type wheel 18 and on the dating wheels 54. A printing ribbon 61 is guided between the types and the hammer face 60 in any suitable manner. Following the printing of the ticket, it is severed from the strip 39 by a knife 43, so that it may fall freely downwardly, past the now retracted printing hammer 60 into the chute 102.

The plunger 79 is held in its actuated position by a detent 305$^x$ on a crank detent lever 305, 305$^a$. The overweighted end 305$^a$ of this lever causes the detent pawl 305$^x$ to engage the successive teeth 79$^c$ on the plunger 79, so that even though the plunger makes only a partial movement, it is held against a return. It may be pointed out in this connection that a weight of 20 lbs. upon the platform is usually selected as being sufficient to store power within the mechanism for all its power operations: and since this weight is but a small fraction of the weight of an adult, or even of a child, it is apparent that a person stepping upon the platform and then stepping off without depositing a coin will produce a full stroke of the power-storing plunger. For even greater security, however, a number of teeth 79$^c$ are provided, so that even small momentary loads will not result in successive upward and downward movements of the plunger 79 from its "rest" position. The coin trip lever 17 has a detent 85 engaging the lug 89 on a rocking plate 86 which is pivoted to the plate 15, and which tends to rock upwardly at all times under the impulse of the rocking spring 88. When a coin is deposited within the machine and encounters the end of the lever 17, the detent 85 is withdrawn from the lug 89, so that the lever 86 is permitted to swing freely upward and to encounter the arm 305$^a$ of the detent lever, and thereby rock the detent 305$^x$ out of the teeth 79$^c$ of the plunger 79 so that the latter may move freely downward under the impulse of its power-storing weight or spring, whereby the printing and severing operations and resettings are accomplish as described hereinafter, and a resetting of the rocking plate 86 results. Upon the retting of the rocking plate 86, the detent 85 of the coin lever 17 automatically engages by reason of its counterweight 84 with the lug 89 and the parts are thereby reset awaiting a further actuation of the plunger 79.

A pin 317ª fixedly mounted on the plunger 79 projects through a slot 330 in the plate 15 to a position beneath the arm 331 of a crank lever pivoted on the fixed pin 332 and having a second arm 333 with a pivotal connection to the ticket-feeding link 334. A return spring 335 is provided to rock the crank lever 331, 333 about its pivot in a counterclockwise direction. At its other end the ticket-feeding link 334 is pivotally connected to the ticket feed cam plate 336. Suitable screw threads or other means are formed on the link 334 to enable the adjustment of the distance between the pivots 333ª and 336ª at the ends of the link.

The ticket-feeding mechanism has a casing C which is fastened rigidly to the vertical plate 15, and supports the shaft 337 which is rigidly connected for rotation with the ticket-feeding drum 41. This drum is provided with lugs or pins 41ª to engage in suitable holes in the strip of tickets 39 to establish an invariable relation therewith, so that an operative feeding of the tickets is obtained at all times. Suitable guide fingers or rollers, not shown, are provided for maintaining the ticket strip 39 in contact with the ticket-feeding drum 41. The front face Cª of the casing C, as shown in Fig. 4, has two pivot pins 338 and 339 fastened thereon to receive the respective oppositely directed pawls 340 and 341 which have crank arms thereon connected to the return springs 342 and 343 respectively, to hold these pawls in normal engagement with the advancing and locking ratchets 344 and 345, which are likewise rigidly fastened upon the shaft 337 in front of the casing face Cª. The advancing ratchet 344 is located adjacent the ticket-feeding cam plate 336, which is free to rock about the shaft 337, and carries on a pivot 346 a ticket-feeding pawl 347 which is forced by a spring 348 into constant engagement with the edge of the ticket-feeding ratchet 344.

The locking pawl 341 likewise is in engagement with the face of the ticket-feeding ratchet 344, and is so positioned that its nose will drop over the edge of a ratchet tooth into locking engagement therewith just before the ticket has been fed for the predetermined and uniform distance. The ticket limiting or over-throw-preventing ratchet 345 is mounted at a slight distance from the ticket-feeding ratchet 344 to prevent interference between the pawls, and engages with a ticket-limiting pawl 340, which has a flat face 340ª projecting along the face of the ratchet and inwardly from its peripheral edge for the purpose of guiding the pawl 340. This pawl also has a bent-over portion 340ᵇ which rests upon the ratchet 345, or upon the cam surface 349 of the ticket-feeding cam plate 336, and as shown in Fig. 4, it is preferable to provide a small further bent portion 340ᶜ to prevent a movement of the pawl 340 out of its engagement with this cam plate 336.

As shown in my aforesaid copending applications, the coin chute comprises a casing 10 having a zig-zag coin trough 9 therein to successively deliver the coin downward until it enters the diversion gate 11 which is mounted on a pivot 107 of the plate 15 and has a counterweight 108 which normally tends to hold it in position for the actuation of the weighing machine. When the plunger 79 moves downward, its pin 113 rides along the edge of the lever 110 which is likewise pivoted by pin 111 on the frame 15, and is connected by a link 109 to the gate 11: the gate is therefore drawn into the position shown in dotted lines in Fig. 1 as soon as the plunger 79 moves away from its uppermost position, whereby any coin entering the gate 11 is diverted into the return chute 13 and delivered through an orifice 102ª leading to the chute 102. When the plunger 79 is again raised, the coil spring 112 rocks the lever 110 again, and with the assistance of the counterweight 108 the chute 11 returns to the position shown in full lines in Fig. 1, and now drops a coin through the chute 12 and into contact with the end of the coin lever 17.

The weight of a person or other article on the platform of the weighing machine causes an upward movement of the transmitting rod 106 with a rocking of the lever 300 and an upward movement of the link 302, which has its end 310 engaged with a notch in the plunger 79, and hence produces an upward movement of the plunger 79, and the detent 305ˣ respectively engages with the several teeth 79ᶜ and holds the plunger in its successive raised positions.

During this storage of power, the weight on the platform has also caused a downward pull on the weighing link 37 which is taken up by the weighing springs 36 which are attached to the transverse bracket 34 secured to the link 37. These springs are calibrated in the usual manner so that the movement of the link 37 substantially corresponds in distance to the weight which has been brought upon the platform of the machine. The movement of the bracket 34 is transmitted through a swinging link 32 to a rocking segment 26 through the mutual pivot 27 of the swinging link 32, the segment 26 and the guide link 28, the latter being mounted by a pivot 29 on the frame 15. The rocking segment 26 has a slot 30 in an extension to receive a fixed pin 31. A pin 25 on a rack bar 23 rests on the upper or cam surface of the segment 26, and has teeth at its upper end to engage the small pinion 19 mounted on the shaft of the type wheel 18 (Fig. 1ª). As described and claimed in my copending applications, as the swinging link 32 is pulled downward by reason of the weight of the platform, it draws the pivot 27 with it in a guided movement by reason of lever 28, and the engagement of the pin 31 in the slot 30 of the segment 26 causes a rocking of the segment 26 in proportion to the movement of the pivot 27. The segment 26 therefore retreats with respect to the pin 25 by reason (1) of the downward movement of the swinging link 32; (2) by reason of the particular shape of the edge or cam surface of the segment 26. The pin 25 follows the segment in its downward movement, by gravity, and thereby rotates the type wheel 18 to present the proper type opposite the printing hammer head 60. It will be understood that the springs 36 will vary in accuracy one from another: and that during the course of assembly and calibration of the machine, by the use of standard weights on the platform, the segment 26 is brought to certain positions corresponding to given standard weights: and then the upper surface of the segment 26 is filed away at the point then presented beneath the pin 25 until the type wheel 18 indicates the proper figure: this operation is denominated "sealing" the machine, and the segment 26 is called a "sealing plate".

When the coin is dropped into the machine and rocks the lever 17 about its pivot 17ª the detent 85 releases the lug 89 of the swinging plate 86, and this plate pushes with its lug 90 upward on a link 91 to rock a crank lever 77 so that its lug 78 releases the arm 75 attached to the hammer shaft 57, and the hammer is actuated to print from the type wheel 18. Likewise during the upward movement of the rocking plate 86, and shortly after the printing, this rocking plate strikes against the outer end of the detent arm 305ª and thus rocks the detent 305ˣ away from the teeth 79ᶜ so that the plunger 79 may now move freely downward. At the same time the depending arm 305 of this detent encounters the upper end 310 of the push link 302 and likewise moves this link away from the plunger 79, which is entirely free for its downward movement. The downward movement of the plunger 79 delivers the stored power to the several parts of the mechanism. Firstly, the downward movement of the pin 113 on the plunger causes the coin gate 11 to swing to the "return" position shown in dotted lines in Fig. 1. Secondly, the roller 81 on the plunger sweeps against the cam surface of the arm 82 of the hammer shaft 57, which now is located close beneath it, and rubs this arm 82 outward into the position shown in full lines in Fig. 1, until the arm 75 again permits the lug 78 of crank lever 77 to lock the hammer parts in their position for another release. Thirdly, the downward movement of the plunger 79 causes the crank lever 100 to push downward on the end of the severing lever 48 to force the knife 43 upward to sever the ticket. Fourthly, the pin 317ª of the plunger 79 pushes downward on the rocking plate 86 and moves it again to the position shown in Fig. 1, where the detent 85 of the coin lever engages and locks it. During this return movement of the swinging plate 86, its pin 307 pushes clockwise on a beveled end flange of the dog 304 pivoted to the detent arm 305ª, disengaging an offset of a bayonet slot in the dog 304 from the pin 308: this offset of the bayonet slot has heretofore detained the detent 305ˣ against returning to engage the plunger 79: but by reason of this movement from the pin 307, the detent parts are now free to return into engagement with the teeth 79ᶜ.

The next upward movement of the plunger 79 will cause the crank 100 to rock about its pivot and then be returned by spring 104 into position above the severing lever 48.

These parts of the operation have already been described in my copending applications and it now remains to describe the operation of the ticket feeding system.

The method of operation of this ticket feeding system device is as follows: When a weight is deposited upon the scales, and the plunger 79 forced upwardly, the pin 317ª engages the under edge of the crank arm 331 and causes this crank to move clockwise about its pivot against the action of the return spring 335, whereby a thrust is delivered in the direction along the ticket-feeding link 334, which is transmitted thereby as a counterclockwise rocking of the cam plate 336 about the axis of shaft 337. The ticket-feeding pawl 347 secured to the cam plate 336 engages a tooth of the ratchet 344 and causes this ratchet and therewith the shaft 337 and the drum 41 to move counterclockwise and to force the free end of the ticket strip beneath the type wheel 18 and the ribbon 61 into position to be printed. Near the end of the rocking movement of the cam plate 336, the parts are in the position shown in Fig. 3, with the pawl 341 barely resting on the edge of one tooth of the ratchet 344, while the portion 340ᵇ of the pawl 340 is a relatively greater distance away from the advancing edge of one of the teeth of the ratchet 345. A moment later, the pawl 341 will fall behind the tooth of the ratchet 344, so as thereafter to prevent a retrograde movement of the ratchets 344 and 345, the shaft 337, and the ticket-feeding drum 41. A brief interval later the pawl 340 will engage with the respective tooth of the ratchet 345 and prevent any further movement of the shaft 337 and the drum 41. It will be understood that the interval existing in Fig. 3 between the end of the portion 340ᵇ of pawl 340 and the advancing tooth of ratchet 345 has been respectively exaggerated for clearness: but that in practically constructed machines this distance may be made a very small fraction of an inch: and that in any event, since the tickets are fed by angular distances corresponding to the angular separations of the advancing edges of the teeth on ratchet 345, the average length of the tickets as severed is uniform.

The ticket strip has now been advanced to present a new ticket beneath the type wheel 18 and ribbon 61 in position to be printed by the hammer 60, and thereupon severed by the knife 43.

When a coin is deposited in the mechanism, the detent 305ˣ is released, and the plunger 79 moves downward, thus accomplishing the printing and severing operations, with a return of the several mechanisms, and the normally printed and severed ticket drops downward into the chute 102 and is delivered at the front of the weighing machine.

At the same time, however, the pin 317ᵃ has been withdrawn from beneath the crank arm 331, and the latter is drawn downward and in a counterclockwise direction about its pivot by the return spring 335, whereby the crank arm 333 pulls on the ticket-feeding link 334 and produces a clockwise movement of the cam plate 336, which continues until the cam surface 349 of the cam plate 336 comes beneath and raises the portion 340ᵇ of the pawl 340 and holds it out of contact with any tooth of the ratchet 345. During this movement, the pawl 347 has clicked freely over the surface of the ratchet 344, and both ratchets, the shaft 337 and the drum 41 have been retained against a retrograde movement by the engagement of the locking pawl 341 with the ratchet 344, and by the usual friction and inertia of associated parts.

When a new weight comes upon the platform, the cam plate 336 is rocked counterclockwise as before, and its cam surface 349 holds the portion 340ᵇ and pawl 340 raised for a sufficient time for the formerly acting tooth of the ratchet 345 to move beneath the portion 340ᵇ. The pawl 340 is then released by the cam surface 349, so that the portion 340ᵇ will rest upon the ratchet 345 and come thereafter into ticket-limiting contact with the advancing edge of the next tooth.

In the event that the plunger 79 has not been moved the full distance from the "rest" to the "power-storage" positions, but is held by the engagement of detent 305ˣ in some intermediate tooth 79ᵉ, the aforesaid movable coin chute 11 will not have been moved to the position shown in full lines in which it conveys the coin to the coin-tripped lever 17. The coin is therefore returned from the machine, and no downward movement of the plunger 79 with the coupled printing and severing operations occurs. In this way the ticket strip is always advanced for the full distance determined by the pawl 340 and the angular pitch of its ratchet 345, and no mutilated tickets are delivered.

It is obvious that the invention is not limited to the specific illustration employed, but that it may be modified within the scope of the appended claims.

What is claimed as new is:

1. In a coin-controlled, ticket-printing, weighing machine having a plunger moved in one direction from the machine platform to store up power for the printing mechanism, a detent for said plunger to prevent return movement of said plunger after any storage movement thereof, and a coin-controlled releasing means for said detent actuatable by a coin and including an element operated by the plunger to prevent such actuation until the plunger is in the final power storage position, and a ticket feeding mechanism actuated by said plunger during its movement to power storage position whereby to advance a ticket into operative relation with said printing mechanism during such storing movement.

2. In a coin-controlled, ticket-printing, weighing machine having a power storing device moved into power storage position from the machine platform, and a detent to prevent return movement of said storing device after any storing movement thereof; a ticket-feeding mechanism actuated during such power storing movement to advance a ticket for printing, and coin-controlled means to release said detent and to accomplish the printing and delivery of the ticket, said device upon return from power storage position permitting the resetting of said ticket mechanism into position to advance a further ticket.

3. In a coin-controlled, ticket-printing, weighing machine having a printing mechanism, a coin-controlled member to release said printing mechanism for actuation, a device actuated from the machine platform to reset the printing mechanism and coin-controlled member, and a detent releasable by said coin-controlled member and serving to hold said device against resetting movement except upon deposit of a coin; a ticket-feeding mechanism, and means actuated by said device in its movement by said platform to cause said ticket mechanism to advance a ticket, said detent serving to prevent operation of said ticket mechanism after such advancement except upon the deposit of the coin.

4. In a ticket-printing, weighing machine, a printing mechanism, a ticket-feeding mechanism, a member moved in one direction from the machine platform to cause said ticket feeding mechanism to advance a ticket for printing and to store up power to reset said printing mechanism, a detent to prevent the return movement of said member and the advancement of more than one ticket, and means to release said printing mechanism for printing and to release the detent to cause said member to reset said printing mechanism, said ticket feeding mechanism being thereby returned to position for advancement of a further ticket.

5. In a ticket-printing, weighing machine, a ticket feeding mechanism, means operated from the machine platform for actuating the ticket feeding mechanism to feed a ticket, and a device cooperating with the actuating means whereby said means will only be returned for a subsequent ticket-feeding movement when a complete feeding movement has been accomplished.

6. In a ticket-printing, weighing machine, a printing mechanism, a strip-ticket feeding drum, a ratchet to rotate said drum, a rockable plate having a pawl engaging said ratchet to advance the same, a member moved in one direction from the machine platform, means actuated by said member to rock said plate to cause said drum to advance the ticket strip, means to return said plate to its initial position, means to prevent said drum being advanced by more than one ticket distance, a detent to prevent said member from moving in the opposite direction, means to release said detent whereby said plate may be returned by said returning means, and means to prevent operation of said releasing means except upon a full movement of the feeding drum.

7. In a coin-controlled, ticket-printing weighing machine, a ticket-feeding mechanism for a ticket strip, ticket-printing and severing mechanisms, means operated from the machine platform for actuating the ticket-feeding mechanism to feed a ticket, a coin-controlled member to control the return movement of said actuating means and the operation of said ticket-printing and severing mechanisms, and devices associated with the actuating means whereby said means cannot be returned for a subsequent ticket-feeding movement until a complete feeding movement has been accomplished.

8. In a ticket-printing, weighing machine, a feeding device to move a ticket strip, means operated from the machine platform to actuate said device step by step to deliver individual tickets, an overthrow limiting device to prevent delivery of more than one ticket, and devices cooperating with said actuating means whereby said means cannot be returned for a subsequent ticket-feeding movement until a complete feeding movement has been accomplished.

9. In a ticket-printing, weighing machine, a feeding device to advance a ticket strip, a feeding ratchet and a limiting ratchet secured to said feeding device, a pawl to prevent overthrow associated with said limiting ratchet and a pawl to prevent retrograde movement associated with said feeding ratchet, a rocking plate, a pawl moving with said plate to rotate said feeding ratchet, means actuated from the machine platform to rock said plate to rotate said feeding ratchet and advance the ticket strip, and a cam on said plate operative in the retracted position of the latter to lift said overthrow-preventing pawl whereby to enable said plate to produce a further advancement of the ticket strip upon a further actuation by said means.

10. In a coin-controlled, ticket-printing weighing machine, a feeding device to advance a ticket strip, a feeding and a limiting ratchet secured to said feeding device, a pawl engaging said limiting ratchet to prevent overthrow of said ticket strip, a pawl engaging said feeding ratchet to prevent retrogression thereof, a bodily movable pawl to engage and advance said feeding ratchet, said overthrow- and retrogression-preventing pawls cooperating with their respective ratchets to hold the feeding device in its fully advanced position, means to actuate said bodily movable pawl from the machine platform, a detent to hold said means in actuated position, a coin-controlled device to release said detent to permit said bodily movable pawl to return to its initial position, and means actuated during the return movement of the pawl to separate said overthrow-preventing pawl from its ratchet whereby to permit a further advancement of said ticket strip.

11. In a coin-controlled ticket-printing weighing machine, a feeding member to advance a ticket strip, devices to actuate said member from the machine platform to advance said ticket strip by one ticket and then to hold the same at such advanced position against overthrow or return, a detent to hold said devices against return movement during a return of the machine platform, and a coin-controlled member to release said detent whereby said devices move into position for advancement of a further ticket.

12. In a coin controlled, ticket-printing, weighing machine having a printing mechanism, a resetting device for said printing mechanism, and a coin controlled member to release said printing mechanism for operation; a ticket feeding mechanism actuated from the machine platform, a detent to prevent any return movement of said ticket feeding mechanism and means to release said detent, comprising devices actuated with said ticket feeding mechanism to prevent access of a coin to said coin controlled member until said ticket feeding mechanism has completed its movement, and a connection between said coin controlled member and said detent; and a connection between said ticket feeding mechanism and said resetting device to actuate the latter.

13. In a coin controlled ticket-printing, weighing machine, a ticket feeding mechanism actuated from the machine platform, a detent to prevent any return movement of said ticket feeding mechanism, a coin controlled member cooperative with said detent to normally release the same when a coin has been deposited in the machine, and means actuated with said ticket feeding mechanism to prevent the operation of said coin controlled member until the ticket feeding mechanism has accomplished a complete feeding movement.

14. In a coin controlled ticket-printing, weighing machine, a ticket feeding mechanism actuated from the machine platform, a detent to prevent any return movement of said ticket feeding mechanism, a coin controlled member cooperative with said detent to release the same when a coin encounters said member, and means actuated with said ticket feeding mechanism to prevent access of a coin to said coin controlled member until the ticket feeding mechanism has accomplished a complete feeding movement.

In testimony whereof, I affix my signature.

VINCENT F. SLEZAK.